US008566902B2

(12) United States Patent
Draughon et al.

(10) Patent No.: US 8,566,902 B2
(45) Date of Patent: Oct. 22, 2013

(54) SECURE MESSAGING CENTER

(75) Inventors: Alex J. Draughon, Coral Springs, FL (US); Anil B. Kelwalkar, Weston, FL (US); Richard Cinanni, Pompano Beach, FL (US); Lucia R. Delgado, Coral Gables, FL (US); Anna M. Payne, Anthem, AZ (US); Patrice L. Kirner, Davie, FL (US); Brett M. Vankoski, Philadelphia, PA (US); Janice M. Chai-Chang, Weston, FL (US); Allan J. Corupe, Glendale, AZ (US); John Allen, Coral Springs, FL (US); Paul Murphy, New York, NY (US); Miriam Pruett, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 998 days.

(21) Appl. No.: 10/601,468

(22) Filed: Jun. 23, 2003

(65) Prior Publication Data

US 2004/0250109 A1 Dec. 9, 2004

Related U.S. Application Data

(60) Provisional application No. 60/465,818, filed on Apr. 25, 2003.

(51) Int. Cl.
*G06F 21/00* (2013.01)

(52) U.S. Cl.
USPC .............................................. 726/2; 713/202

(58) Field of Classification Search
None
See application file for complete search history.

(56) References Cited

U.S. PATENT DOCUMENTS

| | | | | |
|---|---|---|---|---|
| 5,418,908 | A | | 5/1995 | Keller et al. |
| 5,727,065 | A | | 3/1998 | Dillon |
| 5,787,411 | A | * | 7/1998 | Groff et al. ....................... 707/2 |
| 5,852,812 | A | | 12/1998 | Reeder |
| 5,860,068 | A | | 1/1999 | Cook |
| 5,870,089 | A | | 2/1999 | Fabbio et al. |
| 5,930,792 | A | | 7/1999 | Polcyn |
| 6,014,688 | A | | 1/2000 | Venkatraman et al. |
| 6,029,141 | A | | 2/2000 | Bezos et al. |
| 6,061,448 | A | | 5/2000 | Smith et al. |
| 6,128,603 | A | * | 10/2000 | Dent et al. ...................... 705/40 |
| 6,148,329 | A | | 11/2000 | Meyer .......................... 709/206 |
| 6,175,823 | B1 | | 1/2001 | Van Dusen |
| 6,192,407 | B1 | | 2/2001 | Smith et al. |
| 6,243,722 | B1 | | 6/2001 | Day et al. |
| 6,279,042 | B1 | | 8/2001 | Ouchi |

(Continued)

FOREIGN PATENT DOCUMENTS

| | | |
|---|---|---|
| EP | 1085444 | 3/2001 |
| WO | 0135258 | 5/2001 |

OTHER PUBLICATIONS

Partial Translation of Apr. 7, 2009 Mexican Office Action in Mexican Patent Application No. PA/a/2005/011295.

(Continued)

*Primary Examiner* — Lisa Lewis
(74) *Attorney, Agent, or Firm* — Snell & Wilmer L.L.P.

(57) ABSTRACT

A secure messaging system is disclosed wherein messages are transmitted to a user based on a feature unique to the user, such as an account number. The user authenticates himself, then messages associated with the user can be displayed.

19 Claims, 2 Drawing Sheets

(56) References Cited

U.S. PATENT DOCUMENTS 6,314,425 B1 11/2001 Serbinis et al.
6,321,242 B1 11/2001 Fogg et al.
6,324,565 B1 11/2001 Holt, III
6,334,111 B1 12/2001 Carrott
6,334,142 B1 12/2001 Newton et al.
6,356,937 B1 3/2002 Montville et al. ............ 709/206
6,357,010 B1 3/2002 Viets et al.
6,360,254 B1 3/2002 Linden et al.
6,381,579 B1 4/2002 Gervais et al.
6,385,644 B1 5/2002 Devine et al.
6,397,261 B1 5/2002 Eldridge et al.
6,401,077 B1 6/2002 Godden et al.
6,412,073 B1 6/2002 Rangan
6,452,689 B1 9/2002 Srinivasan
6,453,339 B1 9/2002 Schultz et al.
6,477,243 B1 * 11/2002 Choksi et al. ............ 379/100.06
6,487,599 B1 11/2002 Smith et al.
6,493,760 B1 12/2002 Pendlebury et al.
6,505,236 B1 1/2003 Pollack
6,515,988 B1 2/2003 Eldridge et al.
6,516,411 B2 2/2003 Smith
6,523,063 B1 2/2003 Miller et al.
6,529,956 B1 3/2003 Smith et al.
6,684,248 B1 * 1/2004 Janacek et al. ................ 709/225
6,772,137 B1 * 8/2004 Hurwood et al. ................ 707/2
7,305,430 B2 * 12/2007 Choubey et al. .............. 709/203
7,532,894 B1 * 5/2009 Muhonen et al. .......... 455/456.1
2002/0052923 A1 * 5/2002 Anderson ..................... 709/206
2002/0055909 A1 5/2002 Fung et al. ...................... 705/42
2002/0120869 A1 * 8/2002 Engstrom ..................... 713/201
2002/0143754 A1 * 10/2002 Paulley et al. .................... 707/3
2002/0169750 A1 * 11/2002 Eaton et al. ....................... 707/1
2003/0208441 A1 * 11/2003 Poplawski et al. .............. 705/40
2003/0219709 A1 * 11/2003 Olenick et al. ................ 434/350
2007/0078869 A1 4/2007 Carr et al.
2009/0234708 A1 9/2009 Heiser, II et al.

OTHER PUBLICATIONS

Office Action dated Nov. 23, 2011 in Canadian Application No. 2,522,754.

Office Action dated Nov. 9, 2011 in European Application No. 04750339.6.

International Search Report dated Jun. 22, 2005 in Application No. PCT/US2004/012056.

Written Opinion dated Jun. 22, 2005 in Application No. PCT/US2004/012056.

International Preliminary Report on Patentability dated Oct. 28, 2005 in Application No. PCT/US2004/012056.

Examination Report dated Jul. 6, 2012 in European Application No. 04750339.6.

* cited by examiner

SECURE MESSAGING CENTER

CROSS-REFERENCE TO RELATED APPLICATIONS

This application claims priority from U.S. Provisional Application Ser. No. 60/465,818, filed Apr. 25, 2003.

FIELD OF INVENTION

This application generally relates to a system for secure messaging, and more particularly, to a computer-implemented method and system for providing a secure area for users to read electronic messages.

BACKGROUND OF THE INVENTION

Electronic mail ("e-mail") has revolutionized communications. Before the advent of e-mail, communications in writing were typically transferred via a postal service or facsimile. However, both methods suffer from various problems. For example, mail sent via the postal service takes a relatively long time to reach the destination, and the cost to decrease the delivery time rises quickly if a special delivery service is used. Facsimile transmission often suffers from quality and availability problems, as a facsimile transmission is typically of lower quality than the original and many individuals do not have easy access to facsimile machines.

E-mail solved or minimized several of those problems, as the transmission time of an email is very short and the quality of the received communication is identical to that of the original. However, one problem with typical e-mail usage is the relative low security of e-mail transmissions. Specifically, an e-mail communication typically travels throughout the Internet such that the email could possibly be intercepted and read. One method to minimize the problems of eavesdropping is to encrypt communications by using, for example, a public-key cryptography solution. Using such a solution, only the intended recipient can decrypt the e-mail. However, such an encryption process is often cumbersome and many people do not wish to go through the routine of decrypting the e-mail and/or sending their keys to e-mail senders.

Moreover, certain types of businesses often wish to send private messages to its customers. For example, financial institutions, such as banks, credit card companies, brokerages, and the like, often send periodic statements to account holders to inform the account holders as to the performance of their accounts. Such information is intended to be private and it is not desirable to allow third parties to read these types of messages. Therefore, many businesses still use postal services to provide such services. However, in addition to the limitations discussed above, usage of postal services usually results in additional expenditures for the business, such as envelopes, paper, and postage, that may not be necessary if electronic statements were utilized.

To alleviate some of the security issues, companies used secure websites to allow access to information. Specifically, if the company wishes for a customer to view a statement, the business sends an e-mail to the customer, wherein the e-mail contains a Uniform Resource Locator ("URL"). The URL leads the customer to a secure area of the network, wherein the secure area contains the statement in question. This is typically accomplished by providing a Secure Sockets Layer ("SSL") encoding of the site located at the URL in question. However, such a setup still suffers from a variety of problems. For example, the e-mail being sent to the customer containing the URL is not secure, meaning that one can intercept the message and access the URL in question. Accordingly, a need exists for allowing users to access messages in a more secure manner.

SUMMARY OF THE INVENTION

A system is disclosed which solves the above-described problems. The system provides for a means by which a user can access private messages. The method for facilitating the sending of messages includes storing the message in a database; associating the message with an intended recipient by a first unique identifier; notifying the intended recipient of the message for said recipient which is stored in the database; providing a web site for the recipient to view the message; authenticating the recipient using a second unique identifier; searching the database to find messages associated with the recipient by matching said first unique identifier; and displaying the messages associated with the recipient.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

An embodiment of the present invention operates by establishing a secure area of a web site in which a customer can access various messages. Other embodiments of the present invention include a system and method for associating messages with unique identifiers, then searching and displaying the messages having similar unique identifiers.

Figure 1:
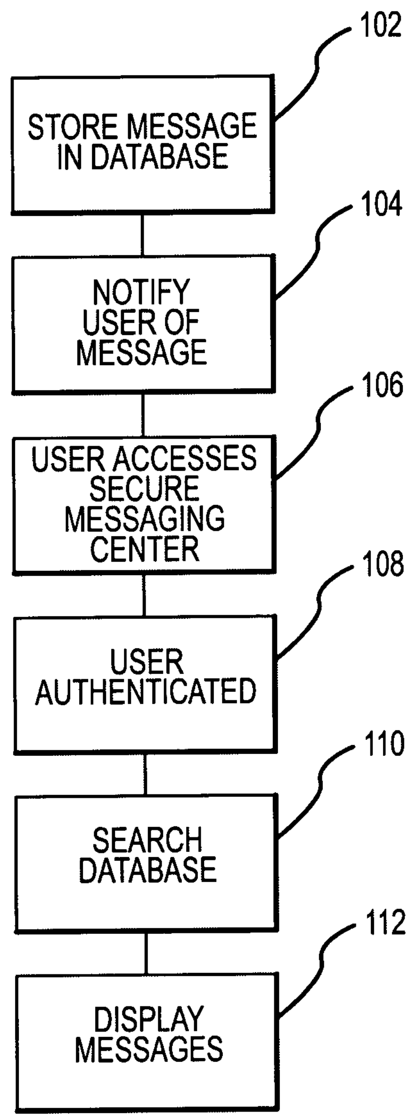
FIG. 1 is a flowchart illustrating the operation of an embodiment of the present invention.

More specifically, with reference to FIG. 1, in an exemplary embodiment, when an entity wishes to send a message to a user, it stores the message in a database (step 102). The message may be stored in the database by a variety of different methods now known, or developed in the future. Databases discussed herein may be any type of database, such as relational, hierarchical, object-oriented, and/or the like. Common database products that may be used to implement the databases include DB2 by IBM (White Plains, N.Y.), any of the various database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Many types of messages can be sent to the user including, for example, statements, special offers, responses to inquiries, transaction confirmations and/or the like. The user is then notified that there is a message waiting for him (step 104). This notification may occur in any of a variety of manners known in the art or hereafter developed. For example, the system may cause one or more emails to be sent to the user, wherein the email indicates that the user has a message waiting for him and the system may disclose a particular site where the email can be accessed. Communication between the parties may be accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

The user then accesses a site with a webpage where he can obtain the message (step 106). In an embodiment of the present invention, the user would access a web site by entering in a URL in a web browser, such as Internet Explorer, Mozilla, Netscape Navigator, and the like. In the alternative, the user may click on a link which leads the user to the web site. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like. A server may include a web service which receives a request from a browser which includes a URL (http://yahoo.com/stockquotes/ge) and an IP address (123.56.789). The web service retrieves the appropriate webpages and sends the webpages to the IP address.

Once at the website, the user authenticates himself using an identifier (step 108). This may occur in a variety of ways, such as, for example, the entry of a user id and/or password (GUID or Global Unique Identifier), biometric means (such as fingerprint identification, retinal and iris scans, hand geometry, facial feature recognition, signature dynamics, voice verification, and the like), electric dongles, and/or the like. In an embodiment of the present invention, after the user is authenticated, communications between the user and the website are secure. The secure communications may be provided through SSL, secure http, transport layer security ("TLS") or a variety of other methods now known or developed in the future.

After the user is authenticated and the user indicates a desire to view messages (for example, by clicking a link), the database is searched to find messages directed to the user (step 110). The searching may include a variety of methods now known or developed in the future. For example, an SQL SELECT command may be used to query the database. After the messages are retrieved, they are displayed to the user (step 112). Such a display step may occur in one of a variety of methods now known or developed in the future. In an embodiment of the invention, a link to the message is presented to the user on the user's display device, along with various aspects of the message, such as a date/time of transmission, and a subject line.

Figure 2:
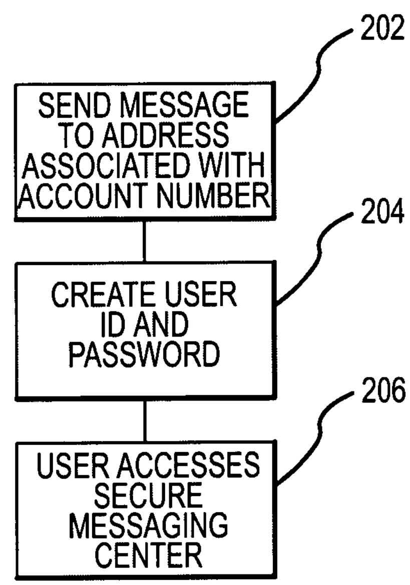
FIG. 2 is a flowchart further illustrating the operation of an embodiment of the present invention.

In another embodiment of the present invention, it is not necessary for a user to have created a user ID/password in order to receive messages. With reference to FIG. 2, messages in the database may be associated with an identifier, such as, for example, an account or an account number. Each account holder may have various types of information stored in various databases. The information may include contact information, such as a name, address, telephone number, and e-mail address. When a message is sent to a holder of an account number, an e-mail is sent to the e-mail address of record associated with the account number (step 202). An "account" or "account number", as used herein, may include any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, transponder, radio frequency card and/or the like. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. A merchant account number may be, for example, any number or alphanumeric characters that identifies a particular merchant for purposes of card acceptance, account reconciliation, reporting, or the like.

The user, upon receiving the e-mail, is directed (via a link, pop-up box, instruction, etc.) to a website that allows the user to create a user ID/password (step 204). After creating the user ID/password, the information is shared with the secure message center. The information can be shared by entering the user ID/password information in the database. The user is then directed to the secure message center (step 206). Thereafter, the operation proceeds in a manner similar to that in steps 108 to 112 of FIG. 1.

In an embodiment of the invention, the system may track the user's actions. For example, if a user logs into the system and reads a message, the system tracks such activity in a separate database. In addition, if the user selects a link in the message, such activity may also be tracked by creating entries in the database when such actions occur.

In an embodiment of the invention, a message has an expiration date. After a user reads a message, the message is flagged in the database as being read by that user. A set time period can be set for the message to remain accessible to the user or the system can limit the number of times the message may be accessed. After such time, the user would be unable to access the message. Such functionality can be provided in a variety of manners. For example, there may be a field in the message containing an expiration date. Once the expiration date occurs, the message is eliminated from the database such that it is no longer accessible. In one embodiment of the invention, the message is archived to a separate database, but eliminated from the message database. Such a task allows, for example, the message database to be smaller in size for faster performance.

In another embodiment of the invention, a save feature is available to the user. Using the save feature, the expiration date of the message is extended by a period of time established by the user or a default by the system. Such functionality may be provided by changing the expiration date field in the message database.

In another embodiment of the present invention, attachments are available to both users and to the institution running the system. An attachment is a file in a particular format that is sent along with the text message. For example an attachment may be a spreadsheet file that allows a user to perform calculations and track data. An attachment may also contain an image such as, for example, a scan of a user's statements. The image may be in a variety of formats, such as a PDF file readable by Adobe Acrobat. Attachments may be stored on the server in a manner such that the attachments are accessible by the message database. However, if an unauthorized user was able to gain access to the system, he may be able to view the attachment files. Therefore, in another embodiment of the present invention, the files are stored using Distributed Computing Environment ("DCE") and Distributed File Service ("DFS") (collectively known as DCE/DFS). DCE/DFS provides security and protects and controls access to data. Such security may also be available to the message database.

The above-presented steps provide several advantages over systems of the prior art. For example, instead of using a static "inbox" functionality, wherein messages sent to a user are stored such that messages to a particular user are stored separately from messages to other users, in the present invention, messages to the user are dynamically accessed upon authentication of the user. This typically results in the reduced need for storage space. For example, a credit card company may have a special offer to account holders with credit limits over a certain dollar amount. With a static "inbox" functionality, a message regarding the special offer would typically be sent to each user. Since the "inbox" is on the servers of the credit card company, the result includes possibly thousands of copies of the message residing on the credit card company's servers.

Using the dynamic message retrieval function, only a single copy of the message is stored on the credit card company's servers as an entry in the above-described database. One portion of the entry will note the users to whom the message is addressed. When the user is authenticated, the user will then be able to view a copy of the message. Instead of thousands of copies of the same message being copied and stored on the credit card company's servers, only a single copy, with an indication of the intended recipients, is necessary.

Another benefit of the present invention arises for users with multiple types of accounts. For example, a user may have a brokerage account and a credit account with the same financial institution. In the prior art, each account would have separate messages using separate systems. A user would be required to access many different systems to access all of his messages. Using an embodiment of the present invention, however, a message from, for example, a brokerage unit can be sent to a user along with messages from a credit unit. As described above, it is not even necessary for the brokerage unit and the credit unit to be aware of the user's ID, as messages can be associated with an account number instead of with a user ID.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention. Benefits, other advantages, and solutions to problems have been described above with regard to specific embodiments. No element described herein is required for the practice of the invention unless expressly described as "essential" or "critical."

We claim:

1. A method comprising:

associating, by a computer based system for facilitating secure access to messages, a primary message with a first intended recipient by a first identifier, wherein the primary message is stored for dynamic retrieval in a common storage area of a database;

notifying, by the computer based system, the first intended recipient of the primary message stored in the database using a notification message generated by a processing device, wherein the notification message contains an address of or a link to a secure website, by transmitting the notification message to the first intended recipient;

securely communicating, by the computer based system, the content of the primary message to the first intended recipient initially via the secure website, wherein the primary message is not transmitted via email, and wherein the content of the primary message is not communicated over unsecure channels;

providing, by the computer based system, the website for the first intended recipient to view the primary message;

authenticating, by the computer based system, the first intended recipient using a second identifier associated with the intended recipient;

capturing, by the computer based system, the browser type and IP address of the authenticated first intended recipient for fraud investigation purposes;

searching, by the computer based system, primary messages stored in the common storage area of the database to find primary messages for the first intended recipient by matching the first identifier with a primary message associated with the first identifier;

providing, by the computer based system, the primary message associated with the first identifier to the first intended recipient for display by the first intended recipient, wherein in response to no second identifier being associated with the first intended recipient, the first intended recipient is prompted to create or register a second identifier; and maintaining, by the computer based system, the primary message in the common storage area of the database for dynamic access by the second intended recipient via the secure website.

2. The method of claim 1, wherein the first identifier is an account code.

3. The method of claim 1, wherein the second identifier is a combination of a user identification and password.

4. The method of claim 1, wherein the second identifier is a physical characteristic of the first intended recipient identifiable by a biometric identification system.

5. The method of claim 1, wherein the primary message includes:

a message portion; and an attachment file in a format that is different from a format of the message portion.

6. The method of claim 1, further comprising a step of encrypting the website to view primary messages using an encryption method.

7. The method of claim 6, wherein the encryption method is SSL.

8. The method of claim 1, further comprising a step of providing a second address of or link to a secure webpage on the secure website, the secure webpage containing the primary message, after successfully authenticating the first intended recipient.

9. The method of claim 1, wherein in response to the primary message having multiple intended recipients, a separate copy of the primary message is not stored in the database for each intended recipient.

10. A method comprising:

associating, by a computer based system for facilitating secure access to messages, a primary message with a first identifier corresponding to a first intended customer recipient, wherein the first identifier includes an account code, wherein the primary message is stored in a common storage area of a secured database;

notifying, by the computer based system, the first intended customer recipient of the primary message stored in the secure database storage system by an electronic mail generated by a processing device, wherein the electronic mail contains an address of or a link to a secure website, by transmitting the electronic mail to the first intended customer recipient;

securely communicating, by the computer based system, the content of the primary message to the first intended recipient initially via the secure website, wherein the primary message is not transmitted via email, and wherein the content of the primary message is not communicated over unsecure channels;

providing, by the computer based system, the secure website for the first intended customer recipient to view the primary message;

authenticating, by the computer based system, the first intended customer recipient to view the at the secure website using a second identifier associated with the first intended customer recipient;

capturing, by the computer based system, the browser type and IP address of the authenticated first intended recipient or fraud investigation purposes;

searching, by the computer based system, the primary messages stored in the common storage area of the secure database for the first identifier to find the primary message associated with the first identifier to be viewed by the first intended customer recipient;

providing, by the computer based system, the primary message associated with the first intended customer recipient to the first intended customer recipient, wherein in response to no second identifier being associated with the first intended customer recipient, the first intended customer recipient is prompted to create or register a second identifier; and maintaining, by the computer based system, the primary message in the common storage area of the secure database for dynamic retrieval by the second intended recipient via the secure website.

11. The method of claim 10, wherein the primary message includes at least one of customer account information, a financial statement, a special offer, a response to an inquiry, and a transaction confirmation.

12. The method of claim 10, wherein the second identifier includes a physical characteristic of the first intended customer recipient identifiable through a biometric identification system.

13. The method of claim 10, wherein the primary message includes:

a message portion; and an attachment file in a format that is different from a format of the message portion.

14. The method of claim 10, further comprising a step of encrypting the website to view primary messages using an encryption method.

15. The method of claim 14, wherein the encryption method is SSL.

16. The method of claim 10, wherein the second identifier is at least one of a user identification, an email address, and a password.

17. The method of claim 10, further comprising a step of providing a second address of or link to a secure webpage on the secure website, the secure webpage containing the primary message, after successfully authenticating the first intended customer recipient.

18. The method of claim 10, wherein in response to a particular primary message having multiple intended customer recipients, a separate copy of the particular primary message is not stored in the database for each intended customer recipient.

19. A system comprising:

a computer network communicating with a memory;

the memory communicating with a processor for facilitating secure access to messages; and the processor, when executing a computer program, is configured to:

associate, by the processor, a primary message with a first intended recipient by a first identifier, wherein the primary message is stored for dynamic retrieval in a common storage area of a database;

notify, by the processor, the first intended recipient of the primary message stored in the database using a notification message generated by a processing device, wherein the notification message contains an address of or a link to a secure website, by transmitting the notification message to the first intended recipient;

securely communicate, by the processor, the content of the primary message to the first intended recipient initially via the secure website, wherein the primary message is not transmitted via email, and wherein the content of the primary message is not communicated over unsecure channels;

provide, by the processor, the website for the first intended recipient to view the primary message;

authenticate, by the processor, the first intended recipient using a second identifier associated with the intended recipient;

capture, by the processor, the browser type and IP address of the authenticated first intended recipient for fraud investigation purposes;

search, by the processor, the primary messages stored in the common storage area of the database to find primary messages for the first intended recipient by matching the first identifier with a primary message associated with the first identifier;

provide, by the processor, the primary message associated with the first identifier to the first intended recipient for display by the first intended recipient, wherein in response to no second identifier being associated with the first intended recipient, the first intended recipient is prompted to create or register a second identifier; and maintain, by the processor, the primary message in the common storage area of the database for dynamic retrieval by the second intended recipient via the secure website.

* * * * *